(12) United States Patent
Thom (10) Patent No.: US 9,617,721 B2
(45) Date of Patent: Apr. 11, 2017

(54) SYSTEMS AND METHODS FOR TRANSPORTING BIO-WASTE

(71) Applicant: Jerry D. Thom, Sandy, UT (US)

(72) Inventor: Jerry D. Thom, Sandy, UT (US)

(73) Assignees: Jerry D. Thom, Sandy, UT (US); Catherine A. Thom, Sandy, UT (US)

( * ) Notice: Subject to any disclaimer, the term of this patent is extended or adjusted under 35 U.S.C. 154(b) by 138 days.

(21) Appl. No.: 14/531,297

(22) Filed: Nov. 3, 2014

(65) Prior Publication Data
US 2016/0122993 A1    May 5, 2016

(51) Int. Cl.
*B65G 65/34* (2006.01)
*E03F 1/00* (2006.01)
*A47K 11/02* (2006.01)
*E03F 11/00* (2006.01)

(52) U.S. Cl.
CPC .............. *E03F 1/002* (2013.01); *A47K 11/02* (2013.01); *E03F 11/00* (2013.01)

(58) Field of Classification Search
CPC .......... A47K 11/02; B65F 1/0093; B60P 1/04; B60P 67/30
See application file for complete search history.

(56) References Cited

U.S. PATENT DOCUMENTS

| | | | | |
|---|---|---|---|---|
| 464,197 A * | 12/1891 | Lanphear | ............... | A47K 11/02 193/18 |
| 464,814 A * | 12/1891 | Condit | ................... | A47K 11/02 4/111.6 |
| 677,141 A * | 6/1901 | Rice | ........................ | A47K 11/02 4/111.6 |
| 4,986,037 A * | 1/1991 | Jackson, Jr. | ............... | E04H 6/04 160/23.1 |
| 4,995,663 A * | 2/1991 | Weaver | ..................... | B60J 7/062 296/100.11 |
| 5,941,182 A * | 8/1999 | Greene | ..................... | A47B 9/12 108/147 |
| 6,101,641 A * | 8/2000 | Hawkins | ................ | A47K 11/02 4/449 |
| 8,266,739 B2 * | 9/2012 | Schaaf | ................... | A47K 11/02 232/43.1 |

(Continued)

*Primary Examiner* — Michael McCullough
*Assistant Examiner* — Mark Hageman
(74) *Attorney, Agent, or Firm* — Workman Nydegger (57) ABSTRACT

A system for receiving and transporting bio-waste without the use of water as a carrier of the bio-waste is disclosed. The system comprises a bio-waste receptacle configured to receive bio-waste and is associated with an exterior wall of a structure. The system further comprises a bio-waste cart receivable at least partially within the bio-waste receptacle and comprising a base and a collection bucket for receiving the bio-waste, the base having a plurality of wheels for transporting the collection bucket. The system further comprises a transport system for moving the bio-waste cart along a pre-defined pathway, the transport system comprising a tunnel-like structure and a mechanical, manually operated locomotive device and wherein the tunnel-like structure conceals the pre-defined pathway and at least a portion of the mechanical, manually operated locomotive device. The system further comprises a bio-waste depository positioned on the pre-defined pathway for receiving the transported bio-waste.

22 Claims, 4 Drawing Sheets

(56) References Cited

U.S. PATENT DOCUMENTS

| | | | | |
|---|---|---|---|---|
| 8,719,973 B2* | 5/2014 | Miner | ................... | A47K 11/02 |
| | | | | 4/460 |
| 2008/0222785 A1* | 9/2008 | Irizarry-Lugo | ........ | A47K 11/02 |
| | | | | 4/483 |
| 2010/0186309 A1* | 7/2010 | Hawkins | ............... | E04B 1/3445 |
| | | | | 52/79.5 |
| 2013/0233625 A1* | 9/2013 | Robinson | ................ | E21B 7/027 |
| | | | | 175/203 |

* cited by examiner

SYSTEMS AND METHODS FOR TRANSPORTING BIO-WASTE

BACKGROUND

1. Technical Field

The present disclosure relates generally to the conservation of natural resources. Specifically, the present disclosure is generally directed to the transportation and disposal of bio-waste that would traditionally use water as a carrier medium.

2. Background and Relevant Art

The world we inhabit contains many natural resources utilized by man for myriad purposes. Historically, the availability and control of natural resources such as fossil fuels, timber, and fresh water have shaped empires and aided in the establishment of world economic powers. This holds true today where the control and use of natural resources is the subject of armed conflicts, economic negotiations, and political divisions, all because we are collectively dependent upon the planet's natural resources. For example, developed nations rely, at least somewhat, on fossil fuels to generate the electricity necessary to power computers and electronics which are integral to maintaining their society's function and status quo, and undeveloped countries are no less dependent upon the planet's natural resources, even if in different ways. While the relative importance of some natural resources may be based on a nation's developmental, geographic, or climatic circumstances, no nation or individual can escape a dependence upon one natural resource in particular—clean, fresh water. And as the human population on Earth swells there is a concomitant increase in the demand and use of all natural resources. Accordingly, there is an impetus for conserving natural resources—especially clean, fresh water—to promote their non-exhaustive use.

Clean, fresh water is required for sustaining life. It is needed as drinking water, it is required to cultivate crops, and it can be used for bathing or otherwise maintaining a sanitary lifestyle. Clean, fresh water is an essential, yet finite, natural resource, and in light of the expanding world population and our dependency on water to provide for our essential needs, approaches to conserving this natural resource may include reexamining our current uses of this precious resource.

Currently, gravity-driven bio-waste disposal systems utilize water as a medium for carriage of the bio-waste. It is an energy efficient process but an inefficient use of clean, fresh water. Toilet manufacturers have taken modern approaches to limiting the total volume of water used per flush, but clean, fresh water still remains as the carrier of bio-waste. Significant amounts of water could be conserved if alternative bio-waste disposal systems were employed at a higher frequency. Unfortunately, current alternatives are outpaced by social norms and the convenience of traditional flush toilets.

Outhouses or similar portable commodes are perhaps one of the simplest applications of bio-waste disposal systems that do not require water as a bio-waste carrier medium. There are, however, some disadvantages associated with outhouses. Perhaps foremost are the inconveniences associated with its traditional implementation as an outdoor commode situated directly above a bio-waste depository. In this configuration, each subsequent user is directly subjected to the fetid odors of previously deposited bio-waste continually piled in a heap of putrefying effluent directly below their person. This can potentially dissuade users. Additionally, outhouses are traditionally detached from residences; this can create issues of personal safety and inconvenience. Nature may call at any hour during any season. Traversing the territory between a person's residence and the outdoor commode could prove treacherous during inclement weather conditions, if not only inconvenient, and depending on the geographic location, an unpleasant or dangerous encounter with wild animals is also possible, especially in more rural areas. While outhouses or similar portable commodes do not use water as a carrier medium and may be a viable alternative to flush toilets for conserving clean, fresh water, there are certain drawbacks associated with their use.

Accordingly, there are a number of disadvantages in the art of natural resource conservation that can be addressed.

BRIEF SUMMARY

Implementations of the present disclosure comprise systems and methods that aid in the conservation of natural resources. In particular, implementations of the present disclosure comprise methods and systems for alleviating the need for water as a carrier medium for bio-waste disposal by facilitating bio-waste removal mechanically. Additionally, implementations of the present disclosure can promote the recycling of bio-waste such that it may be utilized as an energy source.

For example, systems and methods are provided that replace water as a carrier medium for bio-waste with mechanical work to dispose of—and in some embodiments, recycle—the bio-waste. Through interactions with an indoor bio-waste receptacle, bio-waste is received at a bio-waste cart, which can then be translocated along a pre-defined pathway. The work used to move the bio-waste cart is provided by a manually operated crank. In at least one embodiment, the bio-waste can be delivered to a subterranean element for storage or recycling. The bio-waste cart is returned to the bio-waste receptacle through work again provided by the manually operated crank.

In at least one embodiment of the present disclosure, the subterranean element accepting deposited bio-waste may be an apparatus for converting the bio-waste into an energy source. This may include incinerating the bio-waste and converting the resulting thermal energy into mechanical or electrical energy. In another embodiment, the bio-waste may be decomposed by microbes where the resulting gases are collected and used as a combustible energy source. Alternatively, the collected bio-waste may be recycled into fertilizer for crops.

Additional features and advantages of exemplary implementations of the disclosure will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Implementations of the present disclosure extend to systems and methods that aid in the conservation of natural resources. In particular, implementations of the present disclosure comprise methods and systems for alleviating the need for water as a carrier medium for bio-waste disposal by facilitating bio-waste removal mechanically. Additionally, implementations of the present disclosure can promote the recycling of bio-waste such that it may be utilized as an energy source.

Accordingly, implementations of the present disclosure provide a system to dispose of bio-waste without the need for water as a carrier medium, which can act as a conservation of natural resources by reducing the total consumption and reliance on water for bio-waste transportation and disposal. Further, implementations of the enclosed disclosure can promote a safer and more hygienic alternative to traditional portable commodes or outhouses. The systems and methods described herein make it possible to more easily, safely, and hygienically transfer and deposit bio-waste.

Existing technologies are not well-equipped to deal directly with water conservation efforts and societal norms or preferences. Traditional indoor flush toilets have become the societal norm but continue to utilize water as a carrier of bio-waste, whereas other existing technologies such as outhouses or portable commodes do not use water as a carrier of the bio-waste but are generally outside of the societal norm and preference. The aforementioned outdoor facilities are likely to be odorous and unhygienic and are less likely to be embraced as an alternative. Implementations of the present disclosure alleviate the negative connotations associated with using an outdoor facility while simultaneously embracing societal expectations and promoting the conservation of clean, fresh water. Embodiments of the present disclosure are likely to significantly decrease bio-waste odors given the geographical separation of the bio-waste receptacle and the subterranean element containing the bio-waste. Additionally, the social norm of using an indoor commode can be esthetically maintained in embodiments of the present disclosure while still adhering to a conservation-friendly waterless bio-waste disposal system.

Figure 1:
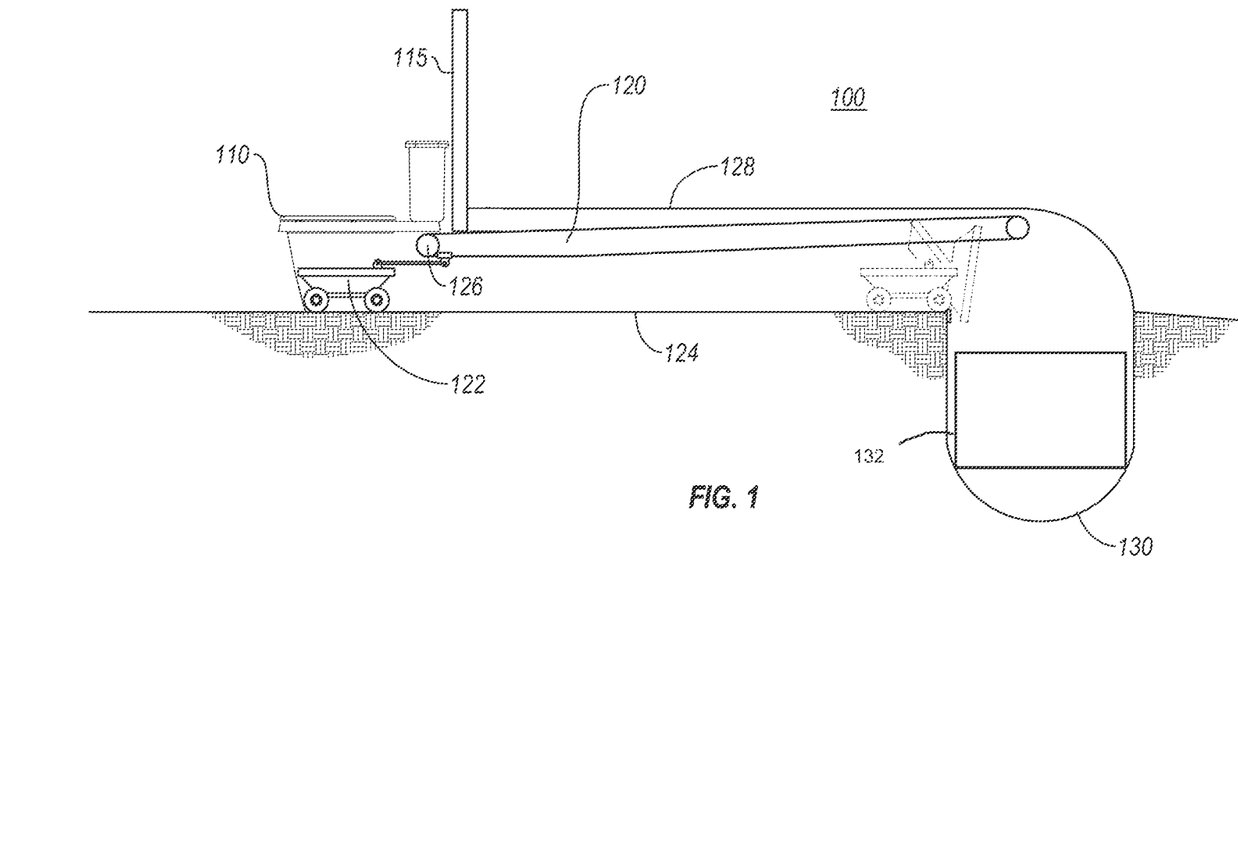
FIG. 1 illustrates a schematic representation of a system for transporting bio-waste according to one implementation of the present disclosure.

For example, FIG. 1 illustrates a schematic representation of a system 100 for transporting bio-waste according to one implementation of the present disclosure. The system 100 comprises a bio-waste receptacle 110 associated with the interior portion of an exterior wall 115 of a structure. The bio-waste receptacle 110 is, therefore, indoors, whether as part of a residential structure such as a house or apartment or as part of a commercial structure such as a business or place of employment. In at least one embodiment, the exterior wall 115 may be part of a portable commode such as a port-o-potty or outhouse.

In at least one embodiment of the present disclosure, at least a portion of the substantially upward facing surface of the bio-waste receptacle 110 is configured to receive bio-waste. Further, the bio-waste receptacle 110 may have an opening on at least one side to allow a bio-waste cart 122 to enter and exit the bio-waste receptacle. In one embodiment, the opening will be positioned at the rear of the bio-waste receptacle 110, and the bio-waste cart may enter and exit the otherwise enclosed lower portion of the bio-waste receptacle 110 via said opening.

Figure 2:
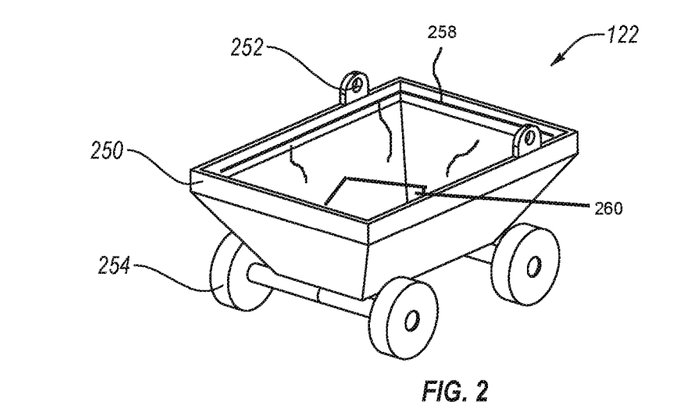
FIG. 2 illustrates an exemplary bio-waste cart according to one implementation of the present disclosure.
Figure 3:
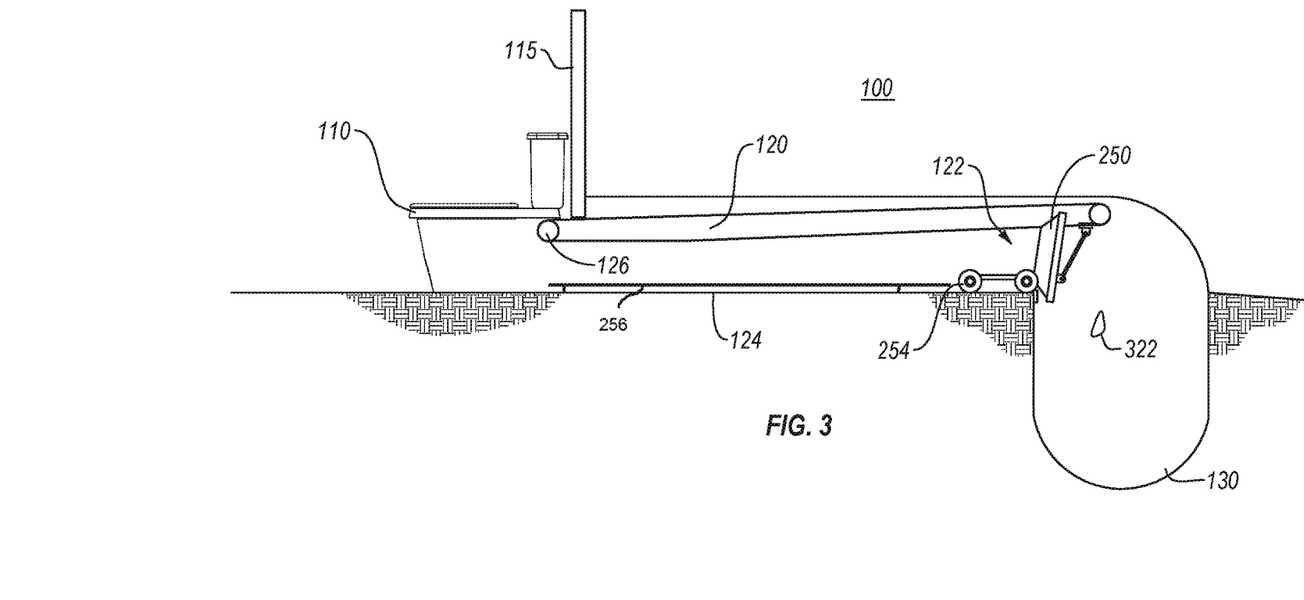
FIG. 3 illustrates a schematic representation of a system for transporting and disposing bio-waste according to one implementation of the present disclosure.

In at least one embodiment, such as that illustrated in FIG. 2, the bio-waste cart 122 comprises a collection bucket 250 for receiving and carrying the bio-waste. The collection bucket may be pivotally attached to a base 254 having a plurality of wheels for transporting the collection bucket. In at least one embodiment, the plurality of wheels 254 are configured to ride on rails 256 (FIG. 3). Optionally, the interior of the collection bucket 250 may support a liner 258 to receive the bio-waste. The optional liner 258 would provide physical separation from the bio-waste and the interior surface of the collection bucket 250. In at least one embodiment, the optional liners 258 may be comprised of plastic or a biodegradable product that functions in a substantially similar capacity. Further, the optional liners 258 may contain absorbent materials 260 such as sawdust or other organic material that will absorb fluid contained in the deposited bio-waste and may also act to assist in the decomposition, incineration, or recycling of the bio-waste.

The bio-waste cart 122 may also comprise attachment elements 252 for connecting the bio-waste cart 122 to the transport system 120 used for bio-waste cart 122 locomotion. In at least one embodiment of the present disclosure, the transport system 120 may comprise a cable mounted about spaced apart pulleys, one of which is adjacent to the bio-waste receptacle 110 and one of which is adjacent to the subterranean element 130. The bio-waste cart 122 may be connectably attached to the cable of the transport system 120 by, for example, a bar or cord fixedly attached to the cable on one end and the attachment elements 252 of the bio-waste cart 122 on the other. For example, FIG. 1 illustrates how the attachment elements 252 connect the bio-waste cart 122 to the transportation system 120. The transport system 120 may also include a manually operated locomotive device 126 for translocating the bio-waste cart 122 along a pre-defined pathway 124.

Applying work to the manually operated locomotive device 126 of transport system 120 causes the bio-waste cart 122 to move along a predefined pathway 124. Work may be applied to the manually operated locomotive device 126 in myriad ways. In one embodiment, work can be applied to the manually operated locomotive device 126 using a hand operated crank. The rotational force directed through the hand operated crank could directly or indirectly cause the rotation of a pulley, consequently driving an associated cable and the attached bio-waste cart 122 along the pre-defined pathway 124. In yet other embodiments, systems of gears, pulleys, or springs may translate a user-applied unidirectional force into forces necessary for driving the bio-waste cart 122 along the pre-defined pathway 124. For example, in one embodiment a manually operated locomotive device 126 may comprise a spring loaded rod connected on one end to a pulley, with the other end attached to a length of cord that is wrapped circumferentially around the spring loaded rod. The user may apply work to the manually operated locomotive device 126 by grasping the cord or another object attached thereto and exerting a directional force away from the spring loaded rod. As the cord becomes unraveled, it may cause the rotational movement of the pulley to drive a cable and attached bio-waste cart 122 along the pre-defined pathway 124.

In the illustrated embodiment of FIG. 1, the predefined pathway 124 is sheltered by a tunnel-like structure 128 that is associated with the exterior side of the exterior wall 115 of the structure and follows the pre-defined pathway 124. As the bio-waste cart 122 traverses the predefined pathway 124, the tunnel-like structure 128 does not obstruct its movement but shields the bio-waste cart 122 from the external environment, tampering, and any interference that may result therefrom. The tunnel-like structure 128 also protects the mechanisms of the transportation system 120 (e.g., the pulley system) and may also act as an anchor for said mechanisms in at least one embodiment of the present disclosure.

While FIG. 1 depicts a pulley system in the transportation system for moving the bio-waste cart 122, one will understand the characterization (e.g., location and interaction) of the transportation system is somewhat arbitrary. In at least one implementation, the transportation system 120 of FIG. 1 may be combined, divided, or organized in configurations other than that which is shown. As used herein, the exact placement of individual components of the transportation system 120 are provided for the sake of clarity and explanation and are not intended to be limiting. In at least one embodiment, the overhead pulley system may be preplaced by an overhead rail system or by a rail system placed beneath the bio-waste cart 122. In the latter, the placement of at least the manually operated locomotive device 126 may be adjusted accordingly. Additionally, while the bio-waste cart 122 and the transportation system 120 are shown and described as being manually operated, it will be appreciated that an automated or semi-automated (e.g., motorized) bio-waste cart 122 and/or transportation system 120 may be employed to transport the bio-waste from the bio-waste receptacle 110 to the subterranean element 130.

FIG. 3 illustrates a schematic representation of system 100 for transporting and disposing bio-waste according to at least one implementation of the present disclosure. For example, applying work to the manually operated locomotive device 126 moves the bio-waste cart 122 along the predefined pathway 124 until it arrives at a subterranean element 130, wherein the bio-waste cart 122 dumps its contents 322 within the subterranean element 130. The act of dumping the contents of the bio-waste cart 122 may be initiated as the base 254 of the bio-waste cart 122 is restrained from moving forward by an obstruction on the predefined pathway 124. The pivotally mounted collection bucket 250 can be acted upon by the transportation system 120 to be at least partially inverted, causing the deployment of its contents into the subterranean element 130.

In at least one embodiment of the present disclosure, the transportation system 120 for moving the bio-waste cart 122 along the predefined pathway 124 may be distinct from the transportation system for moving the bio-waste cart 122 along a separate predefined pathway. Accordingly, the manually operated locomotive device 126 may provide the work required to translocate the bio-waste cart 122 along the predefined pathway 124 of the transportation system 120, whereas a separate manually operated locomotive device may provide the work required to translocate the bio-waste cart 122 along a predefined pathway to the collection receptacle 110. It should be appreciated that the aforementioned embodiments of transport systems are exemplary and provided for the sake of explanation and are not intended to be limiting.

In at least one embodiment, the subterranean element 130 for receiving the transported bio-waste may comprise an earthen pit. An earthen pit, as described herein is intended to include man-made or naturally-occurring holes in the ground, regardless of depth. Earthen pits are not limited to dirt or earth lined holes but are meant to extend to earthen pits lined with concrete, masonry, composites or any other naturally-occurring or man-made material. An earthen pit is meant, for the purposes of this disclosure, to be along the pre-defined pathway 124 as a depository for bio-waste, received from the bio-waste cart 122.

In other embodiments of the present disclosure, the subterranean element 130 comprises a container 132 for recycling the bio-waste. The container 132 may include, but is not limited to a bio-digester, solar dehydrator, composter, or incinerator. For embodiments in which the subterranean element includes a bio-digester, the bio-digester may include systems that allow for the processing of bio-waste with the assistance of microbes for decomposition to produce flammable gases and/or bio-fertilizers for use on crops. These flammable gases are produced as a natural byproduct of anaerobic fermentation that occurs as a result of bacterial utilization of the nutrient dense bio-waste and can be harnessed and used as thermal energy. This thermal energy may be used to provide heat for an associated structure, for cooking, or translated into mechanical work. The mechanical work may then be used to generate electricity or for any other useful purpose (e.g., to power motorized embodiments of bio-waste cart 122 and/or transportation system 120).

In yet other embodiments, the subterranean element 130 comprises an incinerator. This may be as simple as a burn barrel where the bio-waste is deposited, collected, and routinely incinerated. In at least one embodiment, the incinerator is attached to an energy generator. This may include, but is not limited to, a Sterling engine or similar device used to transfer thermal energy into mechanical work. The mechanical work, as noted above may also be used to create electrical energy. The aforementioned embodiments of subterranean elements 130 are meant to be exemplary and should not be construed to uncharacteristically narrow the understanding or spirit of the subterranean element 130 as described herein.

Figure 4A:
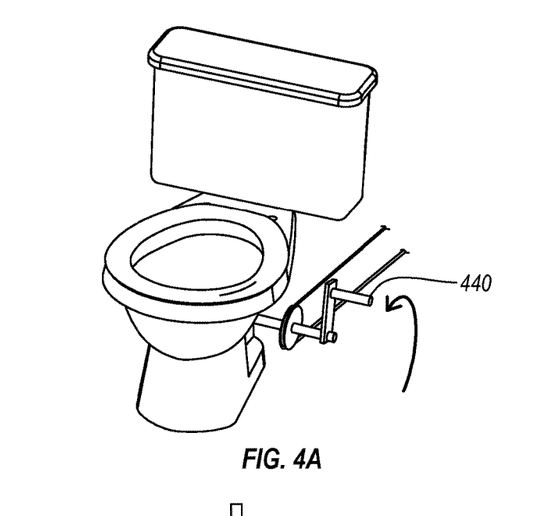
FIG. 4A illustrates a manually operated locomotive device according to one implementation of the present disclosure.
Figure 4B:
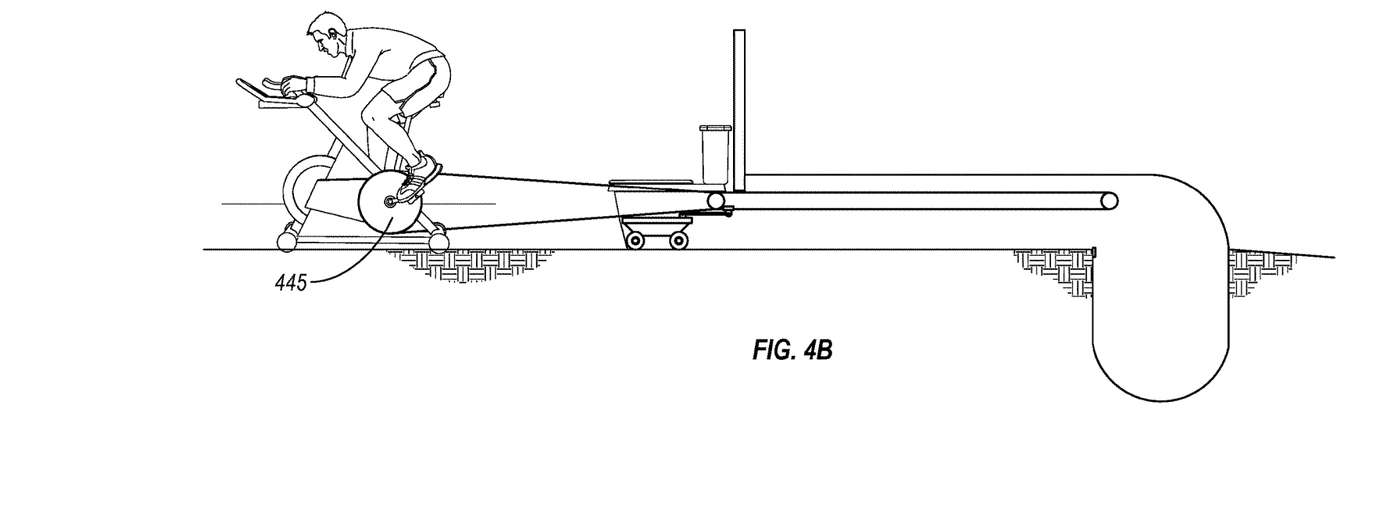
FIG. 4B illustrates a manually operated locomotive device according to one implementation of the present disclosure.

Referring now to FIGS. 4A and 4B, illustrated are examples of manually operated locomotive devices according to implementations of the present disclosure. FIG. 4A is one exemplary illustration of a hand-operated crank 440 that could be used as a manually operated locomotive device 126 in an implementation of the present disclosure. After bio-waste has been deposited into the collection bucket 250 of the bio-waste cart 122, a user applies rotational force to the hand-operated crank 440, and the bio-waste cart 122 attached to the transportation system 120 by the bio-waste cart's attachment elements 252 will be translocated along the predefined pathway 124 as long as work is applied to the hand-operated crank by said user. The bio-waste cart 122 is returned to the bio-waste receptacle 110 through the application of opposite rotational force applied to the hand-operated crank 440.

Similarly, FIG. 4B illustrates an implementation of the present disclosure where the work required for the manually operated locomotive device 126 is derived from a foot-operated crank 445. In some embodiments, the foot operated crank 445 is part of a stationary bicycle or equivalent parts as depicted in FIG. 4B. The additional force offered by a foot-operated crank 445 may be convenient if the subterranean element 130 is elevated above the bio-waste receptacle 110, at a distance, or may simply be used to expedite or ease the process of transporting the bio-waste. The aforementioned methods of providing work to translocate the bio-waste cart 126 are meant to be exemplary only, and any method of transforming said user-induced forces to the translational movement of the bio-waste cart is intended in the scope of this disclosure.

Figure 5:
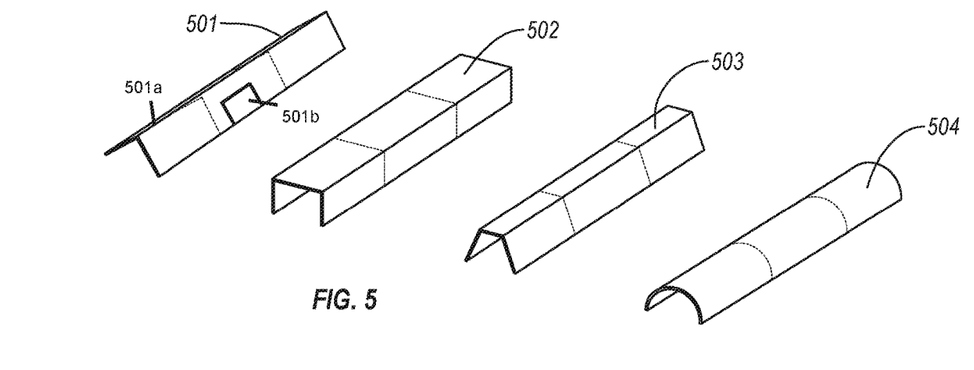
FIG. 5 illustrates exemplary geometric configurations of tunnel-like structures according to implementations of the present disclosure.

Referring now to FIG. 5, illustrated are examples of tunnel-like structures (similar to the tunnel-like structure 128 of FIG. 1) according to implementations of the present disclosure. The tunnel-like structures can have many configurations, including an A-frame 501, box 502, trapezoidal 503, or other polygonal geometries such as pentagonal, hexagonal, heptagonal, octagonal, nonagonal, decagonal, or any other reasonable polygonal geometry to accomplish the same purpose of providing an unobstructed tunnel-like area for a traversing bio-waste cart 126. Tunnel-like structures having an arcuate surface are also meant to be included in the spirit of the tunnel-like structure described herein. The tunnel-like structures may extend to any structure having a substantially arced contour, including the half-pipe 504 depicted in FIG. 5, but is also to extend to substantially spherical, hemispherical, or ovoid shapes where the bio-waste cart would be transported within the concave portion of the arcuate contour.

Figure 6:
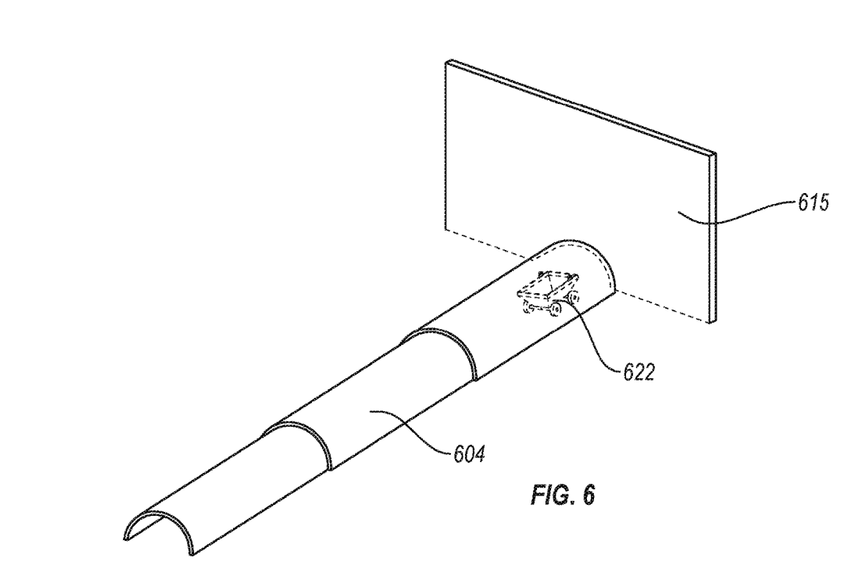
FIG. 6 illustrates a telescoping tunnel-like structure according to one implementation of the present disclosure.

Regardless of the shape of the tunnel-like structure, in at least one embodiment, the tunnel-like structure is meant to be collapsible such that the tunnel-like structure may easily lay flat, whether as by folding or by a hinged mechanism 501a. Further, in at least one embodiment, the tunnel-like structures may be hinged or may otherwise be equipped with doors 501b such that the enclosed pathway 124 may be accessed for maintenance or visualization. In at least one embodiment, and as depicted in FIG. 6, a collapsing tunnel-like structure 604 may collapse through a telescoping mechanism. The telescoping tunnel-like structure 604 can be segmented wherein the segments overlap one another and can be extended and retracted as needed to cover a larger or smaller geographic area with one end associated with the exterior side of a wall of a structure 615 containing the bio-waste receptacle and wherein a bio-waste cart 622 may traverse the interior of the telescoping tunnel-like structure 604 unimpeded. While FIGS. 5 and 6 illustrate potentially straight, rigid tunnel-like structures, it should be appreciated that the tunnel-like structures may be constructed to bend or move angularly from the structure to which it associates.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A system for receiving and transporting bio-waste without the use of water as a carrier of the bio-waste, the system comprising:
a bio-waste receptacle configured to be associated with an interior side of an exterior wall of a structure, the bio waste receptacle having a substantially enclosed lower portion, the substantially enclosed lower portion having an upwardly facing opening through which the bio-waste receptacle is configured to receive the bio-waste, the substantially enclosed lower portion also having an opening in a side wall associated with the exterior wall of the structure;
a bio-waste cart receivable at least partially within the bio-waste receptacle, the bio-waste cart comprising a base and a collection bucket for receiving the bio-waste received by the bio-waste receptacle, the base having a plurality of wheels for transporting the collection bucket, the bio-waste cart being configured to enter and exit the bio-waste receptacle through the opening in the side wall of the bio-waste receptacle;
a transport system for moving the bio-waste cart along a pre-defined pathway, wherein the transport system comprises a mechanical, manually operated locomotive device and a tunnel structure configured to extend from the exterior wall of the structure, wherein the tunnel structure conceals the pre-defined pathway and at least a portion of the mechanical, manually operated locomotive device for advancing and returning the bio-waste cart along the pre-defined pathway; and
a bio-waste depository positioned on the pre-defined pathway, wherein the bio-waste depository comprises a subterranean element for receiving the transported bio-waste.

2. The system in claim 1, wherein the collection bucket is pivotally mounted on the base of the bio-waste cart.

3. The system in claim 1, wherein the interior of the collection bucket supports a liner to receive the bio-waste.

4. The system in claim 3, wherein the liner contains absorbent materials.

5. The system in claim 1, wherein the mechanical, manually operated locomotive device powers a pulley system attached to the bio-waste cart with the pulley system advancing and returning the bio-waste cart when powered by a user-operated crank.

6. The system in claim 1, wherein the mechanical, manually operated locomotive device powers a rail-based system that advances and returns the bio-waste cart when powered by user-derived mechanical forces.

7. The system in claim 1, wherein the subterranean element for receiving the transported bio-waste comprises a container for recycling the bio-waste.

8. The system in claim 7, wherein the container for recycling the bio-waste comprises at least one of: a composter, a solar dehydrator, and a bio-digester.

9. The system in claim 1, wherein the subterranean element for receiving the transported bio-waste comprises a container for incinerating the bio-waste.

10. The system in claim 1, wherein the subterranean element for receiving the transported bio-waste comprises an earthen pit.

11. The system in claim 1, wherein the tunnel structure comprises a polygonal or arcuate surface.

12. The system in claim 1, wherein the tunnel structure is collapsible.

13. A system for receiving and transporting bio-waste without the use of water as a carrier of the bio-waste, the system comprising:
- a bio-waste receptacle configured to be associated with an interior side of an exterior wall of a structure, the bio waste receptacle having a substantially enclosed lower portion, the substantially enclosed lower portion having an upwardly facing opening through which the bio-waste receptacle is configured to receive the bio-waste, the substantially enclosed lower portion also having an opening in a side wall associated with the exterior wall of the structure;
- a bio-waste cart receivable at least partially within the bio-waste receptacle, the bio-waste cart comprising a base and a collection bucket for receiving the bio-waste received by the bio-waste receptacle, the bio-waste cart being configured to enter and exit the bio-waste receptacle through the opening in the side wall of the bio-waste receptacle; and
- a transport system for moving the bio-waste cart along a pre-defined pathway, wherein the transport system comprises a tunnel structure and a locomotive device configured to extend from the exterior wall of the structure, such that the tunnel structure conceals the pre-defined pathway and at least a portion of the locomotive device for advancing and returning the bio-waste cart along the pre-defined pathway.

14. The system in claim 13, wherein the bio-waste cart has a pivotally mounted collection bucket.

15. The system in claim 13, wherein the bio-waste cart further comprises a base having a plurality of wheels for transporting the collection bucket.

16. The system in claim 13, wherein the interior of the collection bucket supports a liner to receive the bio-waste, said liner containing organic absorbent materials.

17. The system in claim 13, wherein the locomotive device comprises a pulley system attached to the bio-waste cart with the pulley system advancing and returning the bio-waste cart when powered by a user.

18. The system in claim 13, wherein the locomotive device comprises a rail-based system associated with the bio-waste cart with the rail-based system advancing and returning the bio-waste cart when powered by a user.

19. The system in claim 13, wherein the locomotive device is at least partially motorized.

20. The system in claim 13, wherein the tunnel structure is telescoping.

21. The system in claim 13, wherein at least a portion of the pre-defined pathway can be accessed at access points of the tunnel structure, the access points comprising at least one of the following: hinged portions, removable panels, and doors.

22. A method for receiving and transporting bio-waste without the use of water as a carrier of the bio-waste, the method comprising:
- receiving bio-waste from a user into a collection bucket of a bio-waste cart located within a bio-waste receptacle,
- translocating the bio-waste cart out of a sidewall opening of the bio-waste receptacle and along a pre-defined pathway from the bio-waste receptacle to a subterranean element, wherein the energy for translocating the bio-waste is derived from a manually operated crank,
- dumping the bio-waste from the collection bucket of the bio-waste cart into the subterranean element, and
- returning the bio-waste cart along the pre-defined pathway and into an interior portion of the bio-waste receptacle, wherein the energy for returning the bio-waste cart to the bio-waste receptacle is derived from the manually operated crank.

* * * * *